UNITED STATES PATENT OFFICE.

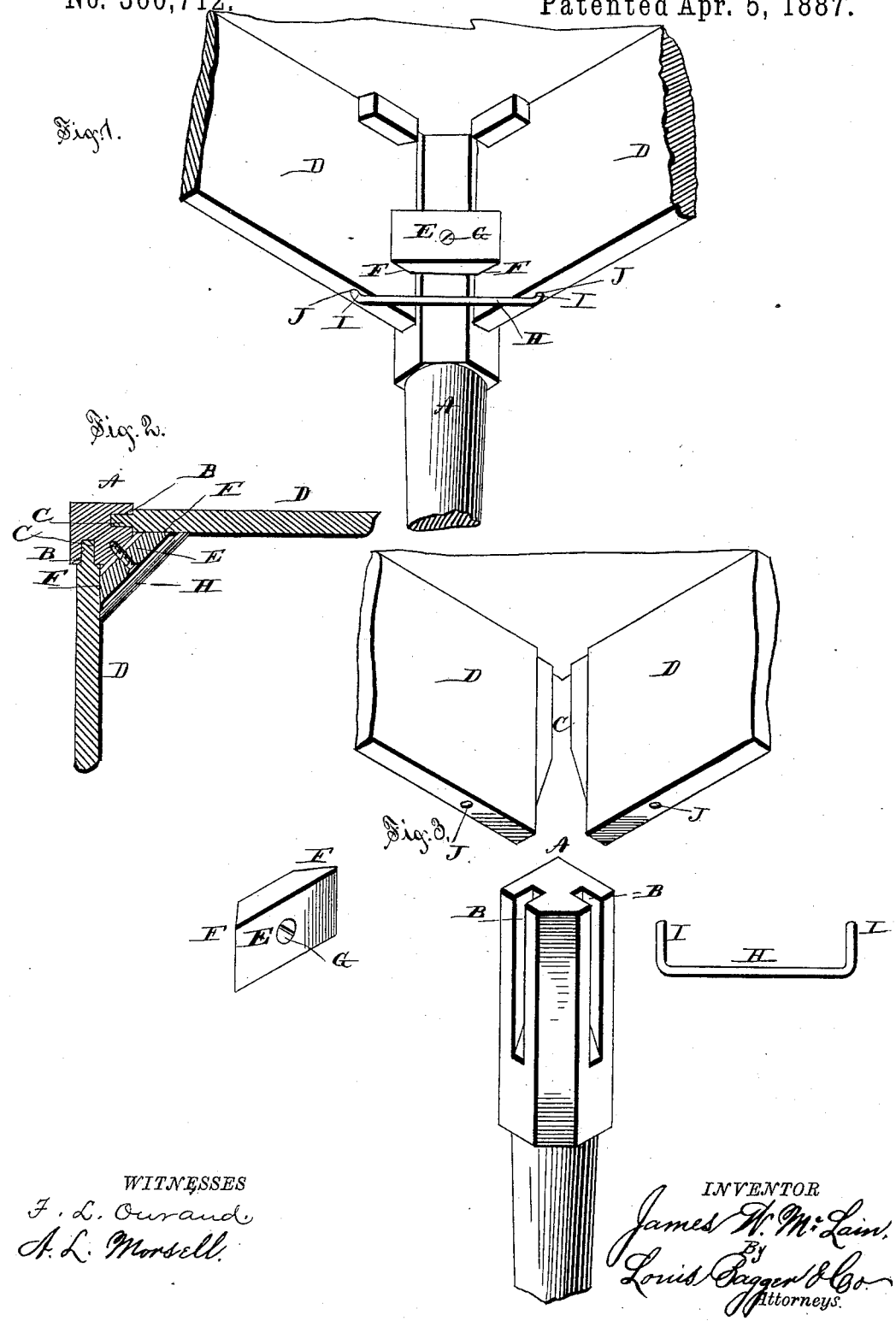

JAMES W. McLAIN, OF SUNBURY, PENNSYLVANIA, ASSIGNOR OF ONE-HALF TO JOHN B. BUCHER, OF SAME PLACE.

TABLE.

SPECIFICATION forming part of Letters Patent No. 360,712, dated April 5, 1887.

Application filed September 10, 1886. Serial No. 213,222. (No model.)

*To all whom it may concern:*

Be it known that I, JAMES W. McLAIN, of Sunbury, in the county of Northumberland and State of Pennsylvania, have invented certain new and useful Improvements in Table-Legs; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view, seen from the inside, of my improved fastening for table-legs. Fig. 2 is a horizontal sectional view of the same, and Fig. 3 is a perspective view showing the parts separated.

Similar letters of reference indicate corresponding parts in all the figures.

My invention has relation to fastenings for table-legs; and it consists in the improved construction and combination of parts of the same, as hereinafter more fully described and claimed.

In the accompanying drawings, the letter A indicates the leg, the upper portion of which is formed at two of its sides with grooves B B, tapering or inclined toward their lower ends, and the tongues C of the side rails, D, of the table are similarly shaped and fit into these grooves, the width of the tongues and the length of the grooves being less than the width of the side rails.

A clamp, E, having beveled ends F F, is secured transversely to the inner corner of the table-leg by means of a screw, G, passing through it into the leg, and the beveled ends of the clamp bear against the inner sides of the side rails, forcing them outward and forcing the tongues with their outer sides against the outer sides of the grooves, at the same time drawing the leg inward upon the tongues.

A rod, H, is formed with upwardly-bent ends I I, and fits with these ends in perforations J J in the lower edges of the side rails, holding the rails together in the corner and drawing against the pressure of the beveled ends of the clamp. This rod is at such a distance from the leg that the clamp E will pass inside of it when the leg is being removed or inserted, as shown in Fig. 2. The tongues having inclined ends and the grooves having correspondingly-shaped ends, admit of an easier adjustment of the tongues of the rails in the grooves, and the beveled ends of the clamp will force the rails outward, while the ends of the bent rod will hold them together, the yoke and the rod thus holding the rails and leg firmly together. This clamp is made narrower than the side rails, so that if by use the hole in the leg for the screw becomes worn, so that the screw will not hold, a new hole can be made above or below the old one, and the clamp be secured as firmly as ever, and still be within the limits of the edges of the side rails; and if the clamp should be split or damaged, a new one can be easily made by any one who can use the ordinary saw, and be secured in place upon the leg. By making the clamp of a separate piece having no permanent connection with the side rails and only loosely secured to the leg by means of the ordinary screw, the table can be made much cheaper than where the side rails must be prepared to receive the ends of the clamp or have them glued to them. Besides, a better and stronger joint can be made where the leg is drawn against the ends of the side rails at the same time that the tongues of the side rails are forced out against the sides of the grooves in the leg than where such a clamp is not used.

Having thus described my invention, I claim and desire to secure by Letters Patent of the United States—

The combination of a table the ends of the rails of which are provided with tongues and also with holes in their lower edges near their ends, rods having their ends bent at right angles and engaging with said holes, removable legs having grooves adapted to receive said tongues, and a clamp loosely secured to each of said legs, the ends of which are beveled and adapted to bear against the side rails and force them out at the same time that the post is drawn against the end of said rails, said clamp being of less thickness than the distance between the rod and leg.

In testimony that I claim the foregoing as my own I have hereunto affixed my signature in presence of two witnesses.

JAMES W. McLAIN.

Witnesses:
J. WEISER BUCHER,
JNO. G. YAMALL.